United States Patent [19]

Arita et al.

[11] Patent Number: 4,555,566

[45] Date of Patent: Nov. 26, 1985

[54] COPOLYMER POLYAMIDE RESIN CONTAINING POLYOLEFIN MOIETY

[75] Inventors: Koichiro Arita; Hajime Suzuki, both of Himeji, Japan

[73] Assignee: Daicel Chemical Industries, Co., Ltd., Sakai, Japan

[21] Appl. No.: 651,633

[22] PCT Filed: Mar. 16, 1982

[86] PCT No.: PCT/JP82/00068

§ 371 Date: Oct. 12, 1982

§ 102(e) Date: Oct. 12, 1982

[87] PCT Pub. No.: WO82/03219

PCT Pub. Date: Sep. 30, 1982

Related U.S. Application Data

[63] Continuation of Ser. No. 440,215, Oct. 12, 1982, abandoned.

[30] Foreign Application Priority Data

Mar. 16, 1981 [JP] Japan .................. 56-38374
Jun. 30, 1981 [JP] Japan ................. 56-102047
Mar. 9, 1982 [JP] Japan .................. 57-36910

[51] Int. Cl.[4] .............. C08G 69/02; C08G 69/14; C08G 69/26; C08G 63/00

[52] U.S. Cl. .................. 528/323; 525/184; 525/334.1; 525/374; 525/375; 525/379; 525/382; 525/426; 528/288; 528/292; 528/310; 528/345

[58] Field of Search ........... 528/323, 345, 292, 288, 528/310; 525/184, 334.1, 374, 375, 379, 382, 426

[56] References Cited

U.S. PATENT DOCUMENTS

| 3,261,885 | 7/1966 | Craubner et al. | 525/184 |
| 3,337,648 | 8/1967 | Aelion et al. | 528/323 |
| 3,373,223 | 3/1968 | Armstrong | 525/179 |
| 3,441,469 | 4/1969 | Fitro et al. | 525/184 |
| 3,862,262 | 1/1975 | Hendrick et al. | 528/323 |
| 3,887,643 | 6/1975 | Selman | 528/323 |
| 4,018,731 | 4/1977 | Sims | 525/184 |
| 4,034,015 | 7/1977 | Hedrick et al. | 528/323 |
| 4,081,424 | 3/1978 | Gergen et al. | 525/184 |

OTHER PUBLICATIONS

Flory, Paul J.; *Principles of Polymer Chemistry*, 1953, pp. 273-275.
Vollmert, Bruno; *Polymer Chemistry*, 1973, pp. 336-347.
Waltz, J. E.; Determination of the Molecular Weight of Nylon, Jul. 1947, pp. 448-450.

*Primary Examiner*—Harold D. Anderson
*Attorney, Agent, or Firm*—Flynn, Thiel, Boutell & Tanis

[57] ABSTRACT

A new copolymer polyamide resin having very low water absorption which comprises copolymerized therein 99 to 5 parts by weight of polyamide polymeric component having at least one kind of repeating unit represented by the formula (1) or (2) below and 1 to 95 parts by weight of polyolefin component having an average molecular weight of 500 to 10,000, both terminals of said polyolefin being carboxylic acid groups, amino groups, or hydroxyl groups.

$$-NH(CH_2)_nCO- \quad (1)$$

(where n is an integer from 5 to 11.)

$$-NHXNHCOYCO- \quad (2)$$

(where X is $C_mH_{2m}$ (m is an integer from 6 to 12), isophorone group, phenylene group, or cyclohexylene group; and Y is $C_lH_{2l}$ (l is an integer from 4 to 10), phenylene group, or cyclohexylene group.)

11 Claims, No Drawings

COPOLYMER POLYAMIDE RESIN CONTAINING POLYOLEFIN MOIETY

This application is a continuation, of U.S. Ser. No. 440 215, filed Oct. 12, 1982, now abandoned.

DESCRIPTION

TECHNICAL FIELD

The present invention relates to a new copolymer polyamide resin having low water absorption.

BACKGROUND ART

As is well known, polyamide resins find use in fibers and other broad application areas. However, they suffer from disadvantages that the dimensional stability of their moldings is poor and their electrical and other properties are greatly affected by moisture, because they have inherently high water absorption due to their structure having the amide bond. The effect of moisture on the electrical properties is important, for example, in the field where polyamides are used as a heat-sensitive element or a temperature fuse for the heating element of electric blankets and electric carpets on account of their characteristics that their impedance varies depending on the temperature and they have a sharp melting point inherent in crystalline polymers. Therefore, for such applications there are used nylon 11 and nylon 12 which are comparatively low in water absorption among the class of polyamide resins. Nevertheless, they are still susceptible to moisture and no satisfactory performance has been obtained.

DISCLOSURE OF INVENTION

It is the object of the present invention to provide a new copolymer polyamide resin improved in water absorption, which is an inherent disadvantage of polyamide, and improved in mechanical properties, moldability, and flexibility inherent in polyamide resin.

That is to say, the present invention relates to a new copolymer polyamide resin which comprises copolymerized therein 99 to 5 parts by weight of polyamide polymer component having at least one kind of repeating unit represented by the formula (1) or (2) below and 1 to 95 parts by weight of polyolefin component having a number average molecular weight of 500 to 10,000, both terminals of said polyolefin being carboxylic acid groups, amino groups, or hydroxyl groups.

$$-NH(CH_2)_nCO- \quad (1)$$

(where n is an integer from 5 to 11.)

$$-NHXNHCOYCO- \quad (2)$$

(where X is $C_mH_{2m}$ (m is an integer from 6 to 12), isophorone group, phenylene group, or cyclohexylene group; and Y is $C_lH_{2l}$ (l is an integer from 4 to 10), phenylene group, or cyclohexylene group.)

The present invention also covers the following copolymer polyamide resins. That is, a copolymer polyesteramide resin composed of the following constituent units (A), (B), and (C).

(A): polyamide polymeric component having at least one kind of the repeating units represented by the above formula (1) or (2).

(B): constituent unit represented by the following formula:

$$-CO-C_mH_{2m}-CO-$$

(where m is an integer from 1 to 36)

(C): constituent unit represented by the following formula:

$$-O-Z-O-$$

(where Z is a polybutadiene component of number average molecular weight from 500 to 10,000 with the double bond hydrogenated and the terminals connected to oxygen)

(wherein the constituent units (A) and (B) are connected through the amide bond, the constituent units (A) and (C) are connected through the ester bond, and the constituent units (B) and (C) are connected through the ester bond; the constituent unit (C) accounts for 1 to 80 wt%; and the molar ratio of the constituent unit (B) to the constituent unit (C) is 1:1.2 to 1:0.8), and a new copolymer polyamide resin comprising copolymerized therein 99 to 5 parts by weight of polyamide polymeric component having at least one kind of repeating unit represented by the above formula (1) or (2) and 1 to 95 parts by weight of polybutadiene component of number average molecular weight from 500 to 10,000 with the double bond hydrogenated, both terminals of said polybutadiene being carboxylic acid groups or amino groups.

The polyamide polymeric component constituting the copolymer polyamide resin of this invention and having at least one kind of the repeating unit represented by the above formula (1) or (2) is composed of monomers such as caprolactam, lauryl lactam, 11-aminoundecanoic acid, and 12-aminododecanoic acid, which correspond to the formula (1), and hexamethyleneadipamide, hexamethylenesebacamide, and hexamethylenedodecanamide, which correspond to the formula (2), and diamine salts of cyclic dibasic acids such as terephthalic acid and cyclohexanedicarboxylic acid, and dibasic acid salts of diamines such as phenylenediamine, cyclohexanediamine, and isophoronediamine.

The polyolefin component, with both terminals being carboxylic acid groups, amino groups, or hydroxyl groups, which constitutes the copolymer polyamide resin of this invention, is obtained by radical polymerization of at least one kind of olefin monomer using a proper initiator, solvent, temperature, pressure, and other conditions so that a functional group such as a carboxylic acid group, amino group, or hydroxyl group is introduced into both terminals.

The above-mentioned polyolefin component may also be obtained by polymerizing a monomer having two or more double bonds, with the terminals capped with functional groups selected from a carboxylic acid group, amino group, or hydroxyl group, into a linear polymer and subsequently hydrogenating the linear polymer. For instance, a polyolefin having hydroxyl groups at both ends may be prepared by the steps of living polymerization of polybutadiene, introducing hydroxyl groups to terminals by stopping polymerization with an epoxy compound, and hydrogenating the resulting polymer.

The polybutadiene to be hydrogenated may contain any bonds, e.g., 1,2-bond, 1,4-trans bond, and 1,4-cis bond. Polybutadiene containing the 1,2-bond in a greater ratio is preferable from the standpoint of ease of hydrogenation.

From an ideal viewpoint, the polyolefin should not have at all the above-mentioned functional group on the main chain and the terminals of the polyolefin should be fully capped with the functional group. However, it is inevitable that a small quantity of functional group is introduced into the main chain due to chain transfer in radical polymerization. It is also difficult to introduce fully the functional group into the terminals when stopping the living polymerization. Therefore, it is permissible to prepare the copolymer polyamide resin of this invention from the polyolefin component having 1.2 to 3.0 functional groups introduced in one molecule. A polyolefin having 1.5 to 2.2 functional groups per one molecule may be preferably used.

It is technically difficult to hydrogenate completely a polymer composed of a monomer having two or more double bonds. Therefore, the copolymer polyamide resin of this invention may be prepared preferably from a polyolefin component having a hydrogenation ratio greater than 70%, and more preferably from a polyolefin component having a hydrogenation ratio greater than 90%. Strictly speaking, the polymer which is not fully hydrogenated may not fall under the category of polyolefin in a narrow sense. However, the polyolefin component as used in this invention includes such a polymer.

The polyolefin component in this invention is less effective to lower water absorption of the resulting polyamide resin, if the number average molecular weight is less than 500. The polyolefin component having a molecular weight greater than 10,000 does not provide the polyamide resin having favorable physical properties. Therefore, the polyolefin should have a number-average molecular weight from 500 to 10,000.

The copolymer polyamide resin of this invention should be composed of the two components at specific ratios. If the polyamide polymeric component is used in excess of 99 wt%, the resulting polyamide resin has almost the same physical properties as those of polyamides containing no polyolefin component. If the polyolefin component is used in excess of 95 wt%, the resulting polyamide resin has almost the same physical properties as those of polyolefins. Both cases are not preferable. The ratio of copolymerization should preferably be 95 to 30 parts by weight of the polyamide polymeric component and 5 to 70 parts by weight of the polyolefin component.

The copolymer polyamide resin of this invention is polymerized in essentially the same manner as used for the production of known polyamides in the case where the functional group of the polyolefin is carboxylic acid or amino group. In other words, the copolymer polyamide resin of this invention can be obtained by copolymerizing the monomer for the polyamide polymeric component and the polyolefin containing carboxylic acid groups or amino groups under the same polymerization conditions as used for polymerizing from the monomer the polyamide polymeric component, free of polyolefin component, constituting the copolymer.

In the copolymerization step, diamine or dicarboxylic acid may be added according to the mol fraction of the polyolefin component in order to adjust the molecular weight of the copolymer.

The diamine is exemplified by alkylenediamines such as hexamethylenediamine and dodecamethylenediamine; alicyclic diamines such as cyclohexanediamine; aromatic diamines such as phenylenediamine, or isophoronediamine.

The dicarboxylic acid is exemplified by aliphatic dicarboxylic acids such as adipic acid, sebacic acid, and dodecanedioic acid; alicyclic dicarboxylic acids; and aromatic dicarboxylic acids such as phthalic acid.

In the case where the polyolefin has hydroxyl groups as the functional group, the copolymer polyamide resin of this invention can be obtained by either condensation polymerization or ring opening polymerization. In this case, a dicarboxylic acid may be added according to the mol fraction of the polyolefin in order to adjust the molecular weight of the copolymer. The dicarboxylic acid is exemplified by aliphatic dicarboxylic acids such as adipic acid, sebacic acid, and dodecanedioic acid; alicyclic dicarboxylic acids; and aromatic dicarboxylic acids such as phthalic acid.

The synthesis of the copolymer polyamide resin of this invention from a polyolefin having hydroxyl groups at both terminals is accomplished by condensation reaction of a dicarboxylic acid and an amino acid or diamine, or by ring opening polymerization of lactam in the presence of a dicarboxylic acid, thereby forming a polyamide oligomer having carboxylic acid groups at terminals, and subsequently forming a block copolymer by esterification reaction between the carboxylic acid group at the terminal of the oligomer and the polyolefin having hydroxyl groups at its terminals. The polyolefin diol may be added after the synthesis of the polyamide oligomer or may be present in the system at the beginning of the polyamide synthesis so that the reaction to form the amide bond and the reaction to form the ester bond take place simultaneously. Either way, the two reversible reactions differ in the equilibrium constant and the reaction to form the amide bond takes place first. Therefore, it is essential to remove the liberated water at high temperature under reduced pressure if the block copolymer is to be prepared by the reaction to form the ester bond. According to another possible process, the block copolymer is prepared by condensation reaction accompanied by the ester interchange reaction by carrying out first the condensation reaction between the polyolefin diol and the dicarboxylic acid to synthesize the polyester oligomer having carboxylic acid groups at the terminals and then carrying out the polycondensation reaction of the diamine with the amino acid or dicarboxylic acid in the presence of the oligomer or carrying out the ring opening polymerization of lactam. The block copolymer is also prepared by the condensation reaction accompanied by the ester interchange reaction between the polyester oligomer and polyamide oligomer.

The copolymer polyamide resin of this invention is produced preferably by using a titanium catalyst. Preferably examples of such a catalyst include tetraalkyl titanates such as tetrabutyl titanate and tetramethyl titanate, and titanium-metal salts of oxalic acid such as titanium potassium oxalate. Other catalysts that can be used include tin compounds such as dibutyltin oxide and dibutyltin laurate, and lead compounds such as lead acetate.

The copolymer polyamide resin of this invention may contain copolymerized therein a small quantity of diol components such as cyclohexane-dimethanol and 1,6-hexanediol, and polyfunctional compounds such as trimesic acid, glycerin, and pentaerythritol.

The copolymer polyamide resin of this invention is a block copolymer composed of the polyamide polymeric component and the polyolefin component, and has a number-average molecular weight from about 5,000 to 500,000.

The copolymer polyamide resin of this invention may be incorporated, during polymerization or after polymerization and before molding, with stabilizers such as an antioxidant, heat stabilizer, and light stabilizer, and other additives such as a hydrolysis resistance improver, colorant, flame retardant, reinforcement, filler, molding aid, and plasticizer.

The copolymer polyamide resin of this invention has low water absorption, undergoes little change in dimensions and physical properties due to water absorption, and has good heat resistance. Therefore, it is suitably used for making moldings by injection and extrusion. The copolymer is also used as hot-melt adhesives, solution adhesives, and coating materials. The copolymer is flexible and superior in impact resistance when it contains more than 30 wt% of polyolefin; and such copolymer may be used as an elastomer in the field where flexibility is required or as an impact resistance improver.

The copolymer polyamide resin of this invention has low water absorption and its electrical properties, particularly impedance, are very little dependent on moisture. It has a sharp melting point attributable to the polyamide block and has a characteristic as a thermal fuse. Therefore, it can be advantageously used as a heat-sensitive element for electric blankets and electric carpets.

The copolymer polyamide resin of this invention may be blended with polyamide resins such as nylon-11, -12, and -612 at a ratio of 99.9 to 30 parts by weight of nylon and 0.01 to 70 parts by weight of the copolymer polyamide resin of this invention.

EXAMPLES OF THE INVENTION

The invention is described with reference to the following examples.

EXAMPLE 1

In a separable flask equipped with a stirrer were placed 39.6 g of ω-aminododecanoic acid and 4.54 g of α,ω-dodecanedicarboxylic acid. The reactants underwent polycondensation under a nitrogen stream at 190° C. for 4 hours. To the reaction mixture were added 29.4 g of hydrogenated polybutadiene of number-average molecular weight ($\overline{Mn}$) of 1490 having hydroxyl groups at terminals and 0.05 g of dibutyltin oxide, and the reaction was continued further under a nitrogen stream at 190° C. for 7 hours. Fourteen grams of the reaction product of low condensation degree were transferred to a stainless steel microbomb in which the reaction were carried out in vacuo at 1 mmHg at 210° C. for 1 hour, at 230° C. for 2 hours, and at 270° C. for 8 hours. The resulting polymer was found to have a number-average molecular weight of 9,100 according to end-group analysis, and it could be molded into a tough sheet.

The resulting polymer was crushed and subjected to Soxhlet extraction for 10 hours with toluene. Only a trace of hydrogenated polybutadiene having hydroxyl groups at terminals was found in the toluene extractables. This indicates that the block polycondensation was almost complete. The resulting polymer was found to have ηrel of 1.22 at 25° C. and at a concentration of 0.5 wt% in m-cresol.

The agreement between the calculated and observed values was within the usual limit of variation of elemental analysis. Calcd: C, 77.8; H, 12.5; and N, 3.7 wt%. Found: C, 78.2; H, 12.5; and N, 3.8 wt%. The IR spectrum gave absorptions at 725, 1555, 1640, and 3280 $cm^{-1}$ characteristic of nylon-12; absorption at 2962 $cm^{-1}$ characteristic of hydrogenated polybutadiene; and absorption at 1736 $cm^{-1}$ characteristic of the ester bond connecting the two components.

EXAMPLE 2

In a 200-ml autoclave equipped with a double-helical ribbon stirrer were placed 45.8 g of ω-aminododecanoic acid, 1.5 g of α,ω-dodecanedicarboxylic acid, 0.05 g of dibutyltin oxide, and 16.7 g of polyethylene oligomer having a hydroxyl number of 45 (KOH mg/g) and a viscosity of 14 poise at 100° C. and having more than two hydroxyl groups per one molecule at both terminals and in the chain. The reactants underwent polycondensation under a nitrogen stream at 190° C. for 4 hours. The reaction temperature was raised in vacuo at 0.2 mmHg to 210° C. over 1 hour and further to 270° C. over 2 hours. The reaction was continued for 8 hours at 270° C. The resulting polymer was found to have ηrel of 1.23 at 25° C. and at a concentration of 0.5 wt% in m-cresol.

The agreement between the calculated and observed values was within the usual limit of variation of elemental analysis. Calcd.: C, 76.3; H, 12.4; and N, 5.0 wt%. Found: C, 76.4; H, 12.3; and N, 4.9 wt%. The IR spectrum gave absorptions at 725, 1555, 1640, and 3280 $cm^{-1}$ characteristic of nylon-12; absorption at 2930 $cm^{-1}$ characteristic of methylene chain of polyethylene and nylon; and absorption at 1730 $cm^{-1}$ characteristic of the ester bond connecting the two components.

The resulting polymer was crushed and subjected to Soxhlet extraction for 10 hours with toluene. Only a trace of polyethylene oligomer was found in the toluene extractables. This indicates that the block co-condensation was almost complete.

The melting point measured by DSC (Differential Scanning Calorimeter) was 177° C.

The water absorption after immersion in water at 40° C. for 1 week was 0.73%.

EXAMPLE 3

In a 200-ml autoclave equipped with a double-helical ribbon stirrer were placed 45.8 g of ω-aminododecanoic acid, 1.6 g of α,ω-dodecanedicarboxylic acid, 0.05 g of dibutyltin oxide, and 16.6 g of polybutene-1 oligomer having a hydroxyl number of 47 (KOH mg/m), a viscosity of 930 poise at 30° C. and having more than two hydroxyl groups per one molecule at both terminals and in the chain. The reactants underwent polycondensation under a nitrogen stream at 190° C. for 4 hours. The reaction temperature was raised in vacuo at 0.2 mmHg to 210° C. over 1 hour and further to 270° C. over 2 hours. The reaction was continued for 2 hours at 270° C. The resulting polymer was found to have ηrel of 1.60 at 25° C. and at a concentration of 0.5 wt% in m-cresol.

The agreement between the calculated and observed values was within the usual limit of variation of elemental analysis. Calcd.: C, 76.2; H, 12.4; and N, 5.0 wt%. Found: C, 76.4; H, 12.4; and N, 4.9 wt%. The IR spectrum gave absorptions at 725, 1555, 1640, and 3280 $cm^{-1}$ characteristic of nylon-12; absorption at 2962 $cm^{-1}$ characteristic of polybutene; and absorption at 1736 $cm^{-1}$ characteristic of the ester bond connecting the two components.

The resulting polymer was crushed and subjected to Soxhlet extraction for 10 hours with toluene. Only a trace of polybutene-1 oligomer was found in the toluene extractables. This indicates that the block co-condensation was almost complete.

The melting point measured by DSC was 177° C.

The water absorption after immersion in water at 40° C. for 1 week was 0.58%.

EXAMPLE 4

In a 500-ml Erlenmeyer flask were placed 76.40 g of 12-aminododecanoic acid, 1.57 g of hexamethylenediamine, and 28.92 g of hydrogenated polybutadiene terminated with carboxylic acid groups (prepared by 98% hydrogenated polybutadiene having more than 80% of 1,2-vinyl bond, and a concentration of 0.935 meq/g for the terminal carboxylic acid groups). The reactants were heated to 250° C. under a nitrogen stream. On melting of 12-aminododecanoic acid, the condensation started, with bubbling of liberated water. After heating at 250° C. for 3 hours, the reactants were cooled and the flask was broken to take out the resulting polymer which was light yellowish, translucent and superior in impact resistance. The ratio of the nylon-12 component to the hydrogenated polybutadiene-hexamethylenediamine condensate component was 70/30 in this polymer.

This polymer was dissolved in m-cresol to make a 0.5% solution. The relative viscosity at 25° C. measured by an Ostwald viscometer was 1.43. The polymer was press-molded into a plate, and after immersion in water at 40° C. for 10 days, water absorption measured by a DuPont moisture meter was 1.21%.

The melting point measured by DSC was 172° C.

The results of elemental analysis of this polymer are shown in Table 1.

TABLE 1

|  | C | H | N |
|---|---|---|---|
| Calcd. (%) | 76.2 | 12.3 | 5.4 |
| Found (%) | 76.5 | 12.9 | 5.5 |

The IR spectrum gave absorptions characteristic of nylon-12 homopolymer and weak absorptions at 760 cm$^{-1}$ and 2960 cm$^{-1}$.

EXAMPLE 5

In a 300-ml Erlenmeyer flask were placed 49.11 g of 12-aminododecanoic acid, 0.29 g of hexamethylenediamine, and 4.82 g of hydrogenated polybutadiene as used in Example 4. Polymerization was carried out in the same manner as in Example 4. On cooling, a polymer was obtained which was light yellowish, translucent and superior in impact resistance. The ratio of the nylon-12 component to the hydrogenated polybutadiene-hexamethylenediamine condensate component was 90/10 in this polymer.

This polymer was found to have a relative viscosity of 1.70, a water absorption of 1.49%, and a melting point of 176° C. when measured in the same manner as in Example 4.

The results of elemental analysis of this polymer are shown in Table 2.

TABLE 2

|  | C | H | N |
|---|---|---|---|
| Calcd. (%) | 74.1 | 11.9 | 6.5 |
| Found (%) | 72.7 | 12.6 | 6.4 |

EXAMPLE 6

In a 500-ml separable flask were placed 54.57 g of 12-aminododecanoic acid, 2.61 g of hexamethylenediamine, and 48.20 g of hydrogenated polybutadiene as used in Example 4. The reactants were heated at 220° C. for 2 hours with stirring under a nitrogen stream. A polymer was obtained which was light yellowish transparent and flexible. The ratio of the nylon-12 component to the hydrogenated polybutadiene-hexamethylenediamine condensate component was 50/50 in this polymer.

This polymer was found to have a relative viscosity of 1.30, a water absorption of 1.07%, and a melting point of 167° C. when measured in the same manner as in Example 4.

The results of elemental analysis of this polymer are shown in Table 3.

TABLE 3

|  | C | H | N |
|---|---|---|---|
| Calcd. (%) | 78.3 | 12.8 | 4.2 |
| Found (%) | 77.1 | 13.5 | 4.0 |

The IR spectrum gave absorptions characteristic of nylon-12 homopolymer and weak absorptions at 760 cm$^{-1}$, 2860 cm$^{-1}$, and 2960 cm$^{-1}$.

EXAMPLE 7

In a 500-ml separable flask were placed 32.74 g of 12-aminododecanoic acid, 3.66 g of hexamethylenediamine, and 67.48 g of hydrogenated polybutadiene as used in Example 4. Polymerization was carried out as in Example 6. A polymer was obtained which was light yellowish and very flexible.

The ratio of the nylon-12 component to the hydrogenated polybutadiene-hexamethylenediamine condensate component was 30/70 in this polymer.

This polymer was found to have a relative viscosity of 1.18, a water absorption of 0.95, and a melting point of 155° C. when measured in the same manner as in Example 4.

The results of elemental analysis of this polymer are shown in Table 4.

TABLE 4

|  | C | H | N |
|---|---|---|---|
| Calcd. (%) | 80.4 | 13.2 | 3.0 |
| Found (%) | 77.7 | 13.8 | 2.9 |

The IR spectrum gave absorptions characteristic of nylon-12 homopolymer and weak absorptions at 760 cm$^{-1}$, 2860 cm$^{-1}$, and 2960 cm$^{-1}$.

EXAMPLE 8

In a 500-ml separable flask were placed 76.40 g of 12-aminododecanoic acid, 5.80 g of 6-amino-caproic acid, 1.31 g of hexamethylenediamine, and 24.10 g of hydrogenated polybutadiene as used in Example 4. The reactants were heated at 240° C. for 3 hours under a nitrogen stream. A polymer was obtained which was light yellowish and translucent.

The ratio of nylon-12 component/nylon-6 component/hydrogenated polybutadiene-hexamethylenediamine condensate component was 70/5/25 in this polymer.

This polymer was found to have a relative viscosity of 1.40, a water absorption of 1.57, and a melting point of 168° C. when measured in the same manner as in Example 4.

The results of elemental analysis of this polymer are shown in Table 5.

TABLE 5

|  | C | H | N |
|---|---|---|---|
| Calcd. (%) | 75.2 | 12.1 | 5.9 |
| Found (%) | 74.8 | 12.3 | 5.8 |

EXAMPLE 9

In a 500-ml separable flask were placed 76.89 g of 11-aminoundecanoic acid, 1.57 g of hexamethylenediamine, and 28.92 g of hydrogenated polybutadiene as used in Example 4. Polymerization was carried out as in Example 8. A polymer was obtained which was light yellowish, translucent and superior in impact strength.

The ratio of the nylon-11 component to the hydrogenated polybutadiene-hexamethylenediamine condensate component was 70/30 in this polymer.

This polymer was found to have a relative viscosity of 1.46, a water absorption of 1.41, and a melting point of 186° C. when measured in the same manner as in Example 4.

The results of elemental analysis of this polymer are shown in Table 6.

TABLE 6

|  | C | H | N |
|---|---|---|---|
| Calcd. (%) | 75.5 | 12.2 | 5.7 |
| Found (%) | 75.3 | 12.1 | 5.7 |

The IR spectrum gave absorptions characteristic of nylon-11 homopolymer and weak absorptions at 760 cm$^{-1}$ and 2960 cm$^{-1}$.

Incidentally, nylon-11 homopolymer was found to have a melting point of 192° C. and a water absorption of 1.9% when measured in the same manner as above.

EXAMPLE 10

In a 40-liter autoclave were placed 1.4 kg of lauryl lactam, 578 g of hydrogenated polybutadiene as used in Example 4, 31.4 g of hexamethylenediamine, and 700 g of water. The autoclave temperature was raised to 270° C. over 3 hours. During the heating, the pressure was kept at 20 kg/cm$^2$. Reaction was carried out at 270° C. and 20 kg/cm$^2$ for 5 hours. The pressure was released to 0 slowly over 4 hours, during which the temperature was decreased to 250° C. As soon as the pressure release was complete, nitrogen was fed into the autoclave, and 2 hours later, the polymer was extruded from the bottom of the autoclave and pelletized.

The ratio of the nylon-12 component to the hydrogenated polybutadiene-hexamethylenediamine condensate component was 70/30 in this polymer.

This polymer was found to have a relative viscosity of 1.57.

Nylon-12 homopolymer having a relative viscosity of 1.90 and the copolymer of this example were blended at a weight ratio of 70/30 and 50/50, and the mixture were mixed and extruded by a 30 mm$\phi$ extruder and pelletized.

Test pieces with notches for the Charpy impact test were prepared from the copolymer prepared in this example, the two blends, and nylon-12 homopolymer having a relative viscosity of 1.90. Charpy impact strength was measured for these test pieces at 23° C. and 0° C. The results are shown in Table 7.

It is to be noted from Table 7 that the copolymer prepared in this example is superior in impact resistance and is also effective to improve the impact strength of nylon-12 homopolymer when blended therewith.

TABLE 7

| Specimen | (kg-cm/cm$^2$) 0° C. | 23° C. |
|---|---|---|
| Copolymer | 19.58 | did not break |
| Nylon-12/Copolymer = 50/50 blend | 12.04 | 18.04 |
| Nylon-12/Copolymer = 70/30 blend | 11.38 | 13.22 |
| Nylon-12 homopolymer | 5.34 | 8.52 |

REFERENTIAL EXAMPLE 1

After immersion in water at 40° C. for 1 week, the molded sheet prepared in Example 1 was found to contain 0.502 wt% of water. The impedance measured for a sheet sample dried in vacuo at 70° C. for 5 days and a sheet sample immersed in water at 40° C. for 1 week was $3.0 \times 10^9 \Omega$ cm and $2.4 \times 10^9 \Omega$ cm at 50° C. and 100 Hz, respectively. The difference was only $0.6 \times 10^9 \Omega$ cm. On measurement of DSC at a heating rate of 10° C./min, the specimen exhibited a distinct melting behavior of crystalline polymer with a melting range from 153° to 176° C., a peak temperature of 170° C., and heat of fusion of 7.1 cal/g. The fact that the copolymer is very little susceptible to moisture with respect to impedance and has a sharp melting point permits the copolymer to be used as a heat-sensitive element for electric blankets and electric carpets.

REFERENTIAL EXAMPLE 2

After immersion in water at 40° C. for 1 week, a sheet sample of nylon-12 having a number-average molecular weight of 24,000 was found to contain 1.6 wt% of water. The impedance measured for a sheet sample dried in vacuo at 70° C. for 5 days and a sheet sample immersed in water at 40° C. for 1 week was $3.0 \times 10^9 \Omega$ cm and $1.1 \times 10^9 \Omega$ cm at 50° C. and 100 Hz, respectively. The difference was as great as $1.9 \times 10^9 \Omega$ cm. The sheet sample was found by DSC measurement to have a melting range from 164° to 184° C., a peak temperature of 178° C., and heat of fusion of 9.2 cal/g.

What is claimed is:

1. A polyamide-modified hydrogenated polyolefin block copolymer resin which consists essentially of (A) 99 to 5 parts by weight of a polyamide component consisting essentially of repeating units selected from the group consisting of (1) —NH(CH$_2$)$_n$CO—, wherein n is an integer of from 5 to 11, (2) —NH—X—NH—CO—Y—CO—, wherein X is —C$_m$H$_{2m}$— in which m is an integer of from 6 to 12, isophorone, phenylene or cyclohexylene, and Y is —C$_l$H$_{2l}$— in which l is an integer of from 4 to 10, phenylene, or cyclohexylene, copolymerized with (B) 1 to 95 parts by weight of hydrogenated polyolefin blocks consisting essentially of repeating hydrogenated olefin units; said hydrogenated polyolefin blocks being derived from a hydrogenated polyolefin having a pair of terminal hydroxyl groups and derived from an olefin monomer having at least two double bonds, said hydrogenated polyolefin blocks having a number-average molecular weight in the range of 500 to 10,000 and having a double bond hydrogenation ratio of greater than 70%, said block copolymer resin having a number-average molecular weight in the range of 5,000 to 500,000.

2. A resin as claimed in claim 1, wherein said resin is prepared by a process consisting essentially of condensing at least one monomer selected from the group consisting of amino acids able to form said repeating units (1) with a dicarboxylic acid to thereby form a polyamide oligomer having a pair of carboxyl groups at the terminals thereof; and esterifying said polyamide oligomer with a hydrogenated polyolefin having a pair of hydroxyl groups at the terminals thereof, in contact with a catalyst effective to form a block copolymer consisting of said polyamide oligomer copolymerized with said hydrogenated polyolefin.

3. A resin as claimed in claim 2, wherein said amino acid monomer is 12-aminododecanoic acid, and said hydrogenated polyolefin is hydrogenated polybutadiene having a pair of terminal hydroxyl groups.

4. A resin as claimed in claim 1, wherein said resin contains 95 to 30 parts by weight of said polyamide component (A) and 5 to 70 parts by weight of said polyolefin blocks (B).

5. A resin as claimed in claim 1, wherein said hydrogenation ratio is greater than 90%.

6. A resin as claimed in claim 1, wherein said polyamide component (A) is formed from at least one monomer selected from the group consisting of caprolactam, lauryl lactam, 11-aminoundecanoic acid, 12-aminododecanoic acid, hexamethyleneadipamide, hexamethylenesebacamide, hexamethylenedodecanamide, diamine salts of terephthalic acid, diamine salts of cyclohexanedicarboxylic acid, dicarboxylic acid salts of phenylenediamine, dicarboxylic acid salts of cyclohexanediamine, dicarboxylic acid salts of isophoronediamine, and mixtures thereof.

7. A polyamide-modified hydrogenated polyolefin block copolymer resin which consists essentially of (A) 99 to 5 parts by weight of a polyamide component consisting essentially of units of $-NH(CH_2)_nCO-$, wherein n is an integer of from 5 to 11, copolymerized with (B) 1 to 95 parts by weight of hydrogenated polyolefin blocks consisting essentially of repeating hydrogenated olefin units; said hydrogenated polyolefin blocks being derived from a hydrogenated polyolefin having a pair of terminal hydroxyl groups and derived from an olefin monomer having at least two double bonds, said hydrogenated polyolefin blocks having a number-average molecular weight in the range of 500 to 10,000 and having a double bond hydrogenation ratio of greater than 70%, said block copolymer resin having a number-average molecular weight in the range of 5,000 to 500,000.

8. A resin as claimed in claim 7 wherein said resin is prepared by a process consisting essentially of effecting ring-opening polymerization of a lactam able to form said repeating units (1) with a dicarboxylic acid to thereby form a polyamide oligomer having a pair of terminal carboxyl groups; and esterifying said polyamide oligomer with a hydrogenated polyolefin having a pair of hydroxyl groups at the terminals thereof, in contact with a catalyst effective to form a block copolymer consisting of said polyamide oligomer copolymerized with said hydrogenated polyolefin.

9. A polyamide-modified polyester-modified hydrogenated block copolymer resin consisting essentially of (A) polymeric polyamide units consisting essentially of repeating units of $-NH(CH_2)_nCO-$, wherein n is an integer of from 5 to 11; (B) units of the formula $-CO-C_{m'}H_{2m'}-CO-$, wherein m' is an integer of from 1 to 36; and (C) units of the formula $-O-Z-O-$, wherein Z is a hydrogenated polybutadiene chain having a number-average molecular weight of from 500 to 10,000 and a double bond hydrogenation ratio of greater than 70%, said resin containing from 1 to 80 wt.% of (C), the molar ratio of (B) to (C) being in the range of 1:1.2 to 1:0.8, wherein said units (A) and (B) are connected through amide bonds, said units (B) and (C) are connected through ester bonds, and said units (A) and (C) are connected through ester bonds, said block copolymer resin having a number-average molecular weight in the range of 5,000 to 500,000.

10. A resin as claimed in claim 9, wherein said resin is formed by a process consisting essentially of polycondensing an amino acid able to form said units (A) with a dicarboxylic acid able to form said units (B), and then copolymerizing the polycondensation product thereof with hydrogenated polybutadiene having a pair of terminal hydroxyl groups able to form said units (C).

11. A polyamide-modified polyester-modified hydrogenated block copolymer resin consisting essentially of (A) polymeric polyamide units consisting essentially of repeating units selected from the group consisting of (1) $-NH(CH_2)_nCO-$, wherein n is a integer of from 5 to 11, (2) $-NH-X-NHCO-Y-CO-$, wherein X is $-C_mH_{2m}-$ in which m is an integer of from 6 to 12, isophorone, phenylene or cyclohexylene, and Y is $-C_lH_{2l}-$, in which l is an integer of from 4 to 10, phenylene, or cyclohexylene; (B) units of the formula $-CO-C_{m'}H_{2m'}-CO-$, wherein m' is an integer of from 1 to 36; and (C) units of the formula $-O-Z-O-$, wherein Z is a hydrogenated polybutadiene chain having a number-average molecular weight of from 500 to 10,000 and a double bond hydrogenation ratio of greater than 70%, said resin containing from 1 to 80 wt.% of (C), the molar ratio of (B) to (C) being in the range of 1:1.2 to 1:0.8, wherein said units (A) and (B) are connected through amide bonds, said units (A) and (C) are connected through ester bonds, and saiid units (B) and (C) are connected through ester bonds, said block copolymer resin having a number-average molecular weight in the range of 5,000 to 500,000.

* * * * *

UNITED STATES PATENT AND TRADEMARK OFFICE
CERTIFICATE OF CORRECTION

PATENT NO. : 4 555 566
DATED : November 26, 1985
INVENTOR(S) : Koichiro ARITA et al It is certified that error appears in the above-identified patent and that said Letters Patent is hereby corrected as shown below:

Column 12, line 21; change "(B)" to --- (A) ---.

line 23; change "(A)" to --- (B) ---.

line 52; change "saiid" to --- said ---.

Signed and Sealed this

Twenty-second Day of April 1986

[SEAL]

Attest:

DONALD J. QUIGG

Attesting Officer        Commissioner of Patents and Trademarks